3,337,464
COMPOSITION AND METHOD FOR REMOVING EXPLOSIVE RESIDUES

David C. Sayles, Huntsville, Ala., assignor to the United States of America as represented by the Secretary of the Army
No Drawing. Filed Apr. 23, 1964, Ser. No. 362,208
1 Claim. (Cl. 252—88)

The invention described herein may be manufactured and used by or for the Government for governmental purposes without the payment of any royalty thereon.

This invention relates to novel compositions and to a method for using these compositions in the removal of explosive residues. Particularly, the invention relates to compositions which can be used to impregnate cloths, mops, sponges, and the like to enable these items to pick up particles of solid propellant and/or explosive.

During the manufacture of solid grains of propellants and explosives, the machining, cutting, boring, and handling of the grains result in the formation and accumulation of small, sometimes dust-like particles of the composition from which the grains are made. These particles create an explosion hazard. Thus, it is necessary to continually collect and dispose of these particles in some safe manner. Normally, this is done with a vacuum cleaner. However, the accumulation of the particles in the receptacle also presents potential explosion hazards.

It has now been determined that particles of propellants and explosives can be efficiently and safely collected on a soft, porous material impregnated with a composition of the type comtemplated by the present invention. Furthermore, the collected particles can be safely disposed of simply by burning material. The danger of explosion is thus eliminated.

In accordance with the foregoing, it is an object of the present invention to provide novel composition of matter and a method for their preparation.

A further object of the invention is to provide compositions which are useful in the collection and disposal of particles of propellants or explosives.

A still further object of the present invention is to provide a method for the safe collection and disposal of particles of propellants or explosives.

The manner in which these as well as other objects of the invention can be accomplished will become apparent from the following detailed description.

The resinous compositions of the present invention are the reaction products formed from heating a mixture of about 60% to about 70% tall oil, about 10% to about 20% glycerin, and about 15% to about 20% phthalic anhydride (all percentages expressing percent by weight of the total weight of mixture) for a time interval of about one to five hours at a temperature of about 400° F. to about 600° F. and preferably at about 500° F. Any of the commercially available tall oils can be used in the preparation of the compositions such as those derived from pinewood sulfate or sulfate liquors.

The composition as produced is too viscous for easily impregnating soft, porous materials such as a cloth or sponge. Therefore, it is best to dissolve the composition in substantially an equal weight of an inert organic solvent. There are many suitable solvents for this purpose such as xylene, toluene, acetone, and the like. However, due to personnel safety considerations, mineral spirits constitutes the preferred solvent (mineral spirits encompassing the petroleum fractions boiling between about 200° F. and 300° F.). It should be apparent that the nature of the soft porous material is not critical since it merely serves as a carrier for the composition.

The resinous compositions of the invention can be stored in the form in which they are produced or they can be dissolved as indicated above for storage. Moreover, the soft, porous material (cloths, mops, sponges, and the like) can be impregnated with the composition and stored until needed in a ready-for-use condition.

The following example describes a detailed process for preparing a composition within the scope of the invention:

Fifteen-hundred parts (by weight) tall oil, 364 parts glycerin, and 430 parts phthalic anhydride are thoroughly mixed in a reaction kettle at room temperature. The contents of the kettle are then heated to a temperature of about 500° F., for about 90 minutes. Subsequently, the reaction mass is permitted to cool for about 30 minutes at room temperature. Thereafter, the resinous reaction product is weighed, dissolved in substantially an equal weight of mineral spirits, and the solution thus formed filtered. This solution exhibits the following characteristics:

| | | |
|---|---|---|
| Acid value | | 8–10 |
| Viscosity | Gardner-Holt | A– |
| Color | do | 10–12 |
| Weight per gallon | pounds | 8.0–8.1 |

Squares of cheesecloth cut thirty inches on the side are then immersed in the resinous solution and agitated to insure substantially complete saturation. Thereafter, the cheesecloth squares are run through rollers to remove any excess solution. It is preferred to allow the squares to stand in warm dry air to remove substantially all the remaining solvent leaving only the sticky resinous composition on the squares. The cheesecloth squares thus prepared are ready for use in the removal of particles of propellants and explosives.

According to the present invention, these particles are collected for removal by contacting the resinous composition with the particles. The composition is sufficiently sticky to cause the particles to cling to it tenaciously. The particles and the soft porous material containing the composition are then disposed of by burning, burying, or some other suitable means without the danger of explosion.

The means employed to contact the particles with the resinous composition is obviously not critical to the invention. Mops, cloths, sponges, and the like impregnated with the composition can be wiped over surfaces on which the particles are disposed. Moreover, large sections of cloth can be placed in areas where the particles are most likely to fall such as under a boring or machining device.

Many modifications of the invention will become apparent to those skilled in the art. Therefore, no undue limitation should be attributed to the invention from the above detailed description thereof except as reflected in the appended claim.

I claim:

The method of collecting particles of propellants and explosives, said method comprising; using a resinous reaction product formed by heating a mixture of about 60% to about 70% by weight tall oil, about 10% to about 20% by weight glycerin, and about 15% to about 20% by weight phytalic anhydride at a temperature of about 400° F. to about 600° F. for a period of about one to five hours; by impregnating a soft porous material such as a cloth or sponge with said resinous reaction product; then allowing said particles of propellants and explosives to contact said impregnated porous material; and thereafter disposing of said collected particles by burning or burying.

References Cited

UNITED STATES PATENTS

| | | | |
|---|---|---|---|
| 1,468,380 | 9/1923 | French | 252—88 |
| 1,872,568 | 8/1932 | Ellis | 260—26 |
| 2,146,012 | 2/1939 | De Bell | 260—26 |
| 2,308,005 | 1/1943 | Hellmig et al. | 260—88 |
| 2,448,605 | 9/1948 | Kleinicke | 252—88 |

FOREIGN PATENTS 448,760  5/1948  Canada.

LEON D. ROSDOL, *Primary Examiner.*

SAMUEL H. BLECH, *Examiner.*

W. E. SCHULZ, *Assistant Examiner.*